C. G. BUTTRICK & T. B. FLANDERS.
Spindle-Bearings.
No. 211,218. Patented Jan. 7, 1879.
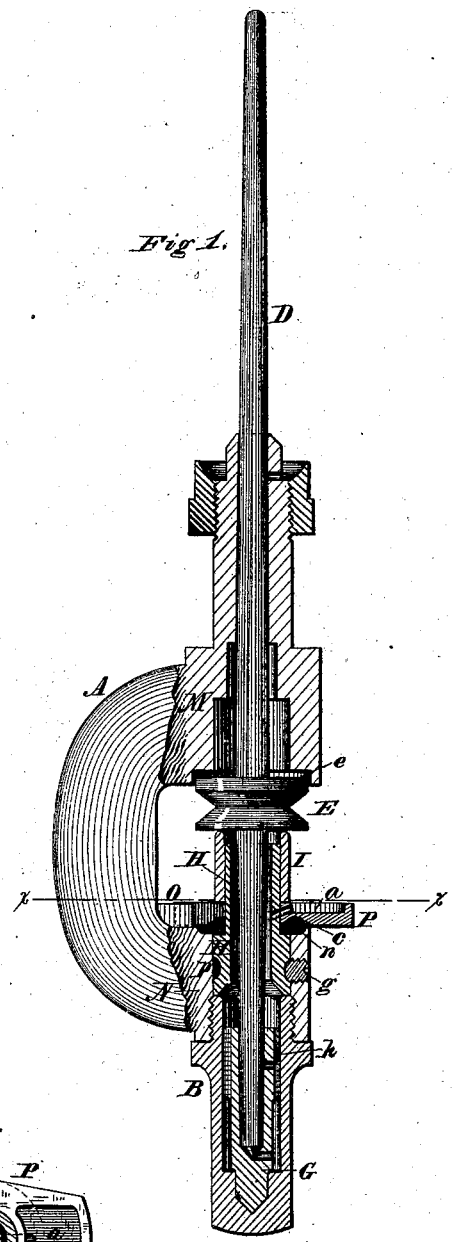
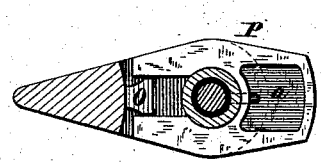
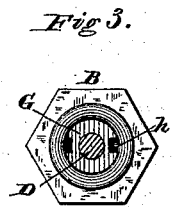

UNITED STATES PATENT OFFICE.

CHARLES G. BUTTRICK AND TIMOTHY B. FLANDERS, OF HOLYOKE, MASS.

IMPROVEMENT IN SPINDLE-BEARINGS.

Specification forming part of Letters Patent No. 211,218, dated January 7, 1879; application filed April 15, 1878.

*To all whom it may concern:*

Be it known that we, C. G. BUTTRICK and TIMOTHY B. FLANDERS, of Holyoke, in the county of Hampden and State of Massachusetts, have invented certain new and useful Improvements in Spindle-Bearings; and we do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 is a side elevation of the spindle and whirl and a longitudinal vertical section of the parts surrounding the spindle. Fig. 2 is a horizontal cross-section on the line $x\, x$ of Fig. 1, and Fig. 3 is a top-plan view of a part detached.

The object of our invention is to produce certain improvements in the surroundings and bearings of a spindle, by means of which it may be covered, protected, kept in its position and in operation while its step is removed and replaced for any purpose, and may also be arrested at any time in its motion when desired.

The nature of our invention consists in the construction and arrangement of certain novel mechanical contrivances by which these improvements, with others, are accomplished.

In the drawings, D represents the spindle, with its whirl E mounted in the stand A. The whirl E is located directly under the upper hub, M, of the stand, and so as to pass within a shallow recess, e, therein, as may be required, as clearly shown in Fig. 1. Upon the spindle D, between the hubs of the stand A, a sleeve, I, is placed, and underneath this a key-plate, P, forked at one end, is inserted, the forks being of the requisite width to straddle the spindle. When this key-plate is in position its forks embrace the lug O on the upper inner side of the lower hub of the stand, and inside of its curved portion, as shown in Fig. 1, but more clearly in Fig. 2. The opposite end of this plate, on its upper side, is provided with an oil-chamber, a, having an oil-hole leading from it toward the spindle, and on its under side it is provided with a circular groove, c, the use of which will be explained hereinafter. The crotch of the fork in this plate forms something more than a semicircle, and is of the requisite size to receive and hold and to be held by a tube, H, from being thrown out of position. This tube is passed up about the spindle through the lower hub of the stand, as clearly shown in Figs. 1 and 2, and has its upper end of the required size to enter and fill the sleeve I, which, in connection with the plate P, it holds in place vertically, as shown in Fig. 1. At the same time it holds the plate P, as the curved crotch in the latter extends more than half-way around it, as shown in Fig. 2. It is provided with a circular groove, p, and when in position, and the step detached, it is securely held by a set-screw, g, which passes through the lower hub of the stand and enters this groove, as shown in Fig. 1. It is also provided with an oil-hole so arranged as to conduct the oil passing down from the oil-chamber of the plate P, as shown in Fig. 1.

In the upper side of the lower hub there is a recess, n, which comes directly under the circular groove in the plate P, the two forming a circular chamber for the oil, as shown in the same figure.

The circular chamber formed by the groove c and the recess n, between the plate P and the lower hub, makes a break in the surface between them. The object of this break or chamber is to prevent the spread of the oil outward from the spindle between these adjoining surfaces; and this it does, for as the oil works to the edge of the inner lips of the groove and recess it is carried down by its own weight into the lower part of the chamber. We have found by actual experiment that this chamber was necessary to prevent the spread of the oil, and we have further found that it accomplishes the desired result.

B is the step-case or cover for the lower end of the spindle, removably attached to the stand, as shown in Fig. 1. h is a projecting pin on the inner side of the case. G is the step, provided with a longitudinal groove or slot to receive the pin h, and to allow it to slide freely in and out of the case when the same is detached, as shown in Figs. 1 and 3.

By this construction it will be seen that the step-case can be detached, the step slipped from its socket, and the whole quickly cleaned and reattached while the spindle continues its work, being supported in the meantime by the other devices, as described.

By the construction and arrangement, as described, of the sleeve I, key-plate P, tube H, and step-case B, a complete cover and protection are made for the spindle below the whirl, and other important advantages are secured.

If for any purpose it is desired to arrest the motion of the spindle, it is only necessary to raise up the outer end of the plate P, which acts then as a lever, causing the sleeve I to bear up against the whirl, and thus stop the spindle.

Should it be desired at any time to examine the step, it can be done without loss of time or motion to the spindle, for when the step-case is detached for that purpose the whirl will bear upon the sleeve I, and can turn upon it, and being thus kept or supported in its normal position, the spindle may go on and do its work until the step-case with the step therein is replaced.

Having thus described our invention, what we claim is—

1. The combination of the sleeve I, plate P, and tube H, constructed and arranged to operate as herein described, and for the purpose specified.

2. The combination of the tube H and the forked key-plate P, constructed and arranged as herein described, for holding said plate in position, as set forth.

3. The combination of the plate P, provided with the groove c, and the lower hub of the stand provided with the recess n, constructed and arranged as described, to prevent the spread of the oil, as set forth.

4. The combination of the plate P and lug O with the sleeve I and tube H, constructed and arranged to operate as described, for arresting the motion of the spindle, as set forth.

5. The combination of the plate P, tube H, and sleeve I with the lower hub, for supporting the spindle in its normal position without interfering with its motion, as set forth.

6. The stand A and spindle-supporting devices, in combination with the detachable step-case B, provided with pin h, and the step G, provided with a longitudinal groove, as shown and described, for the purpose of allowing the case to be removed for any purpose while the spindle continues its work, supported meantime by the stand and its adjuncts, as set forth.

In testimony that we claim the foregoing as our own invention we affix hereto our signatures in presence of two witnesses.

CHAS. G. BUTTRICK.
TIMOTHY B. FLANDERS.

Witnesses:
J. H. FRASER,
P. J. CRAFTS.